June 2, 1936.　　　　P. KULIKOWSKI　　　　2,042,902

HEDGE TRIMMER

Filed March 27, 1935

Peter Kulikowski
INVENTOR

BY Victor J. Evans & Co.

HIS ATTORNEYS

Patented June 2, 1936

2,042,902

UNITED STATES PATENT OFFICE 2,042,902

HEDGE TRIMMER

Peter Kulikowski, Chicago, Ill.

Application March 27, 1935, Serial No. 13,340

3 Claims. (Cl. 30—11)

My invention relates to trimming devices, and has among its objects and advantages the provision of an improved hedge trimmer.

Figure 1:
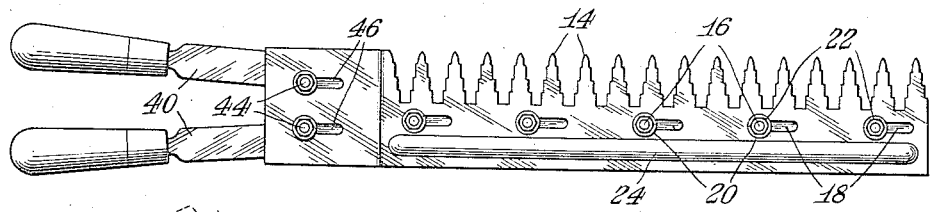
Fig. 1 is a top plan view of the device.

In the embodiment selected to illustrate my invention, I make use of two blades 10 and 12, each having one edge provided with a plurality of similarly shaped cutting teeth 14. The blades are mounted one upon the other and secured in operative relation by means of a plurality of bolts 16. These bolts have one end fixedly connected with the blade 12 and project through slots 18 in the blade 10 to permit relative movement between the blades in the direction of the longitudinal axes of the blades.

Washers 20 and nuts 22 are mounted upon the bolts for securing the two blades together. Each blade is provided with a stiffening formation 24.

Figure 4:
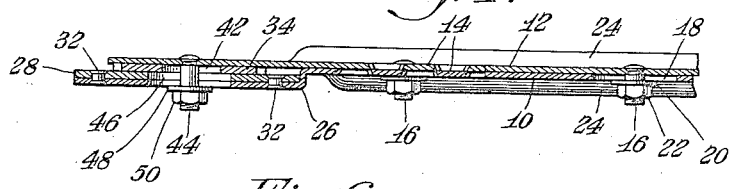
Fig. 4 is a sectional view along the line 4—4 of Fig. 2.
Figure 5:
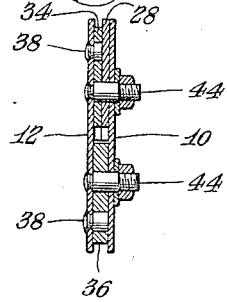
Fig. 5 is a sectional view along the line 5—5 of Fig. 2.

In Fig. 4, the blade 10 is offset at 26 to provide a reach arranged in spaced relation with the blade 12 for accommodating the actuating mechanism. This mechanism comprises a blade 28 having a rack 30 secured to the reach 26 by rivets 32.

Underneath the blade 28 I mount a segmental gear 34 having its teeth arranged to mesh with a second segmental gear 36 in the same way as the rack 30. In other words, the gear 36 has a thickness equal to both the segmental gear 34 and the blade 28. Each of the segmental gears is pivotally mounted at 38 to the blade 12, and each gear is provided with an actuating handle 40.

Figure 2:
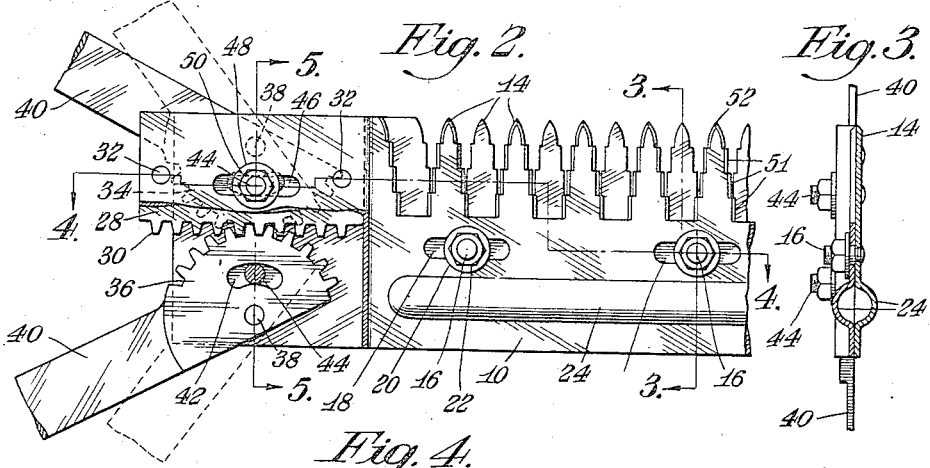
Fig. 2 is an enlarged sectional view of the actuating mechanism for the blades.
Figure 3:
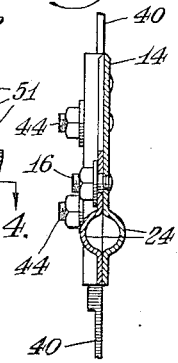
Fig. 3 is a sectional view along the line 3—3 of Fig. 2.

Referring to Fig. 2, the segmental gears 34 and 36 are provided with curved slots 42 for the reception of bolts 44 operating to limit the rotary movement of the gears about their axes 38. These pins are fixedly connected with the blade 10 and extend through slots 46 in the reach 26 for the reception of washers and nuts 48 and 50 which connect all the parts into an operating assembly.

In view of the intermeshing relation between the gears 34 and 36 and the rack 30, oscillatory movement of the handles 40 about their axes 38 imparts a cutting action to the blades 10 and 12. This action consists in the reciprocatory movement of the blade 10 upon the blade 12, and the amount of movement is such as to shift the blades a distance equal to the spacing between the points of the teeth upon the blade 12.

Each blade is provided with a plurality of parallel cutting edges 51 upon each side, which edges are positioned at right angles to the longitudinal axis of the blade. The ends of the teeth terminate in a sharp point 52. I find that a more efficient cutting action is attained with the cutting edges arranged at right angles to the blade. This alignment eliminates any tendency for the twigs to shift with respect to the blade, as is true in connection with cutting devices having a sharp edge arranged at a different angle to the blade.

Figure 6:
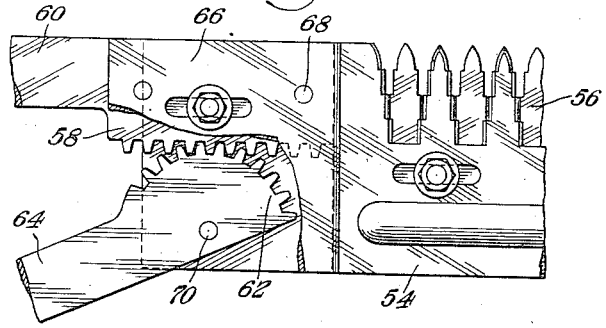
Fig. 6 is a fragmentary sectional view of another form.

In Fig. 6 the blades 54 and 56 are identical in construction with the blades 10 and 12, but the rack 58 comprises an extension of the handle 60, which rack is arranged in mesh with the gear 62 on the handle 64. The rack 58 is riveted to the reach 66 corresponding to the reach 26 by rivets 68. In this form the handle 64 oscillates about its axis 70, while the handle 60 remains stationary. In the form previously described, both the handles oscillate and are always positioned at similar angles with respect to the blade axis.

Without further elaboration, the foregoing will so fully explain my invention that others may, by applying current knowledge, readily adapt the same for use under various conditions of service.

I claim:

1. A hedge cutter comprising a pair of toothed blades arranged in overlapping relation, one of said blades being provided with an offset portion, a handle fixedly connected with said offset portion, the latter having a slot, a guide pin carried by the other of said blades and extending through said slot, said handle being provided with a rack, a second handle pivotally connected with the said other of said blades, and a gear carried by said second handle and arranged in mesh with said rack.

2. A hedge trimmer comprising two blades, one of said blades being provided with an offset reach, a rack fixedly connected with said offset reach, a gear pivotally connected with the other of said blades and arranged in mesh with said rack, a second gear pivotally connected with the said other blade and arranged in mesh with said first-named gear, both of said gears having slots, said rack and said reach being provided with aligned slots registering with the slot in the second-named gear, said offset reach being provided with a second slot registering with the slot in the first-named gear, a pin fixedly connected with the said other blade and projecting through the slot in said first-named gear and the slot in said reach aligning therewith, a second pin fixedly connected with the said one of said blades and extending through the slot in the second-named gear and the slots in said rack and said reach aligned therewith, means for pivotally connecting the gears with the said other of said blades, and operating handles connected with said gears.

3. A hedge trimmer comprising two blades arranged in overlapping relation with each blade provided with a plurality of cutting teeth, means for movably relating the blades, a pair of handles pivotally connected with one blade, each handle having a gear, the said gears arranged in mesh, and a rack fixedly connected with the other blade and arranged in mesh with one of said gears.

PETER KULIKOWSKI.